United States Patent [19]
Dancy

[11] 3,829,559
[45] Aug. 13, 1974

[54] SOLUTION MINING PROCESS

[75] Inventor: William B. Dancy, Lakeland, Fla.

[73] Assignee: International Minerals & Chemical Corporation, Libertyville, Ill.

[22] Filed: Feb. 18, 1971

[21] Appl. No.: 116,569

[52] U.S. Cl.................. 423/497, 423/184, 423/499
[51] Int. Cl............................ C01d 3/04, C01f 5/30
[58] Field of Search........... 423/497, 155, 158, 499, 423/179, 184

[56] References Cited
UNITED STATES PATENTS

| | | | |
|---|---|---|---|
| 1,304,097 | 5/1919 | Reeve | 423/499 X |
| 1,305,566 | 6/1919 | Reeve | 423/499 X |
| 2,479,001 | 8/1949 | Burke et al. | 423/497 X |
| 2,968,525 | 1/1961 | Clark et al. | 423/179 |
| 3,442,553 | 5/1969 | Kutz | 299/4 |
| 3,498,745 | 3/1970 | Nylander | 423/184 |
| 3,615,174 | 10/1971 | Lewis | 423/158 |

*Primary Examiner*—Edward Stern
*Attorney, Agent, or Firm*—Peter Andress; James E. Wolber

[57] ABSTRACT

An improved process for the recovery of ore values from carnalitte by solution mining techniques is disclosed. The carnallite-containing ore deposit is contacted with an aqueous stream, which may be merely water or an aqueous solution of magnesium chloride, to impregnate the same with magnesium-containing ore values. These dissolved ore values are primarily carnallite when the aqueous stream contains at least about 25 percent magnesium chloride and magnesium chloride when the aqueous stream initially contains a smaller quantity of magnesium chloride. The impregnated stream is removed from the ore deposit and sufficient water is removed to precipitate substantially all the potassium-containing ore values dissolved from the formation. The precipitated potassium containing ore values are in the form of carnallite. The resulting slurry is filtered and the magnesium chloride-containing filtrate is removed, at least part of which provides magnesium chloride product. The filter cake is slurried with sufficient water to decompose the carnallite to soluble magnesium chloride and insoluble potassium chloride. The magnesium chloride solution is removed and advantageously recycled to the earlier water removal step in the process. The insolubles may be treated to provide potassium chloride products.

10 Claims, 1 Drawing Figure

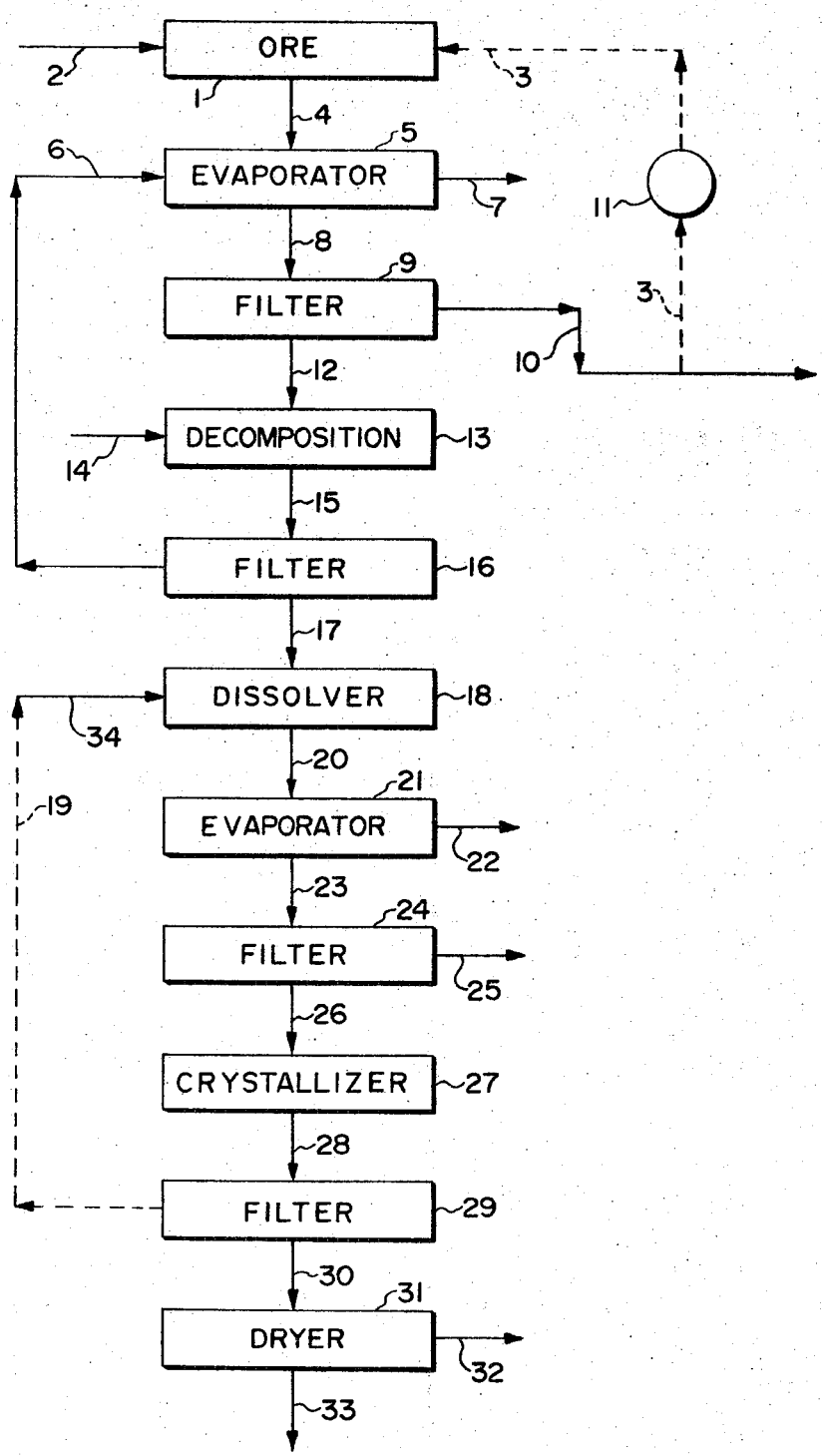

SOLUTION MINING PROCESS

BACKGROUND OF THE INVENTION

This invention relates to a process for recovering magnesium chloride and potassium chloride from carnallite ore-containing deposits. In particular, this invention relates to an improved solution mining process for the recovery of magnesium chloride and potassium chloride from carnallite ore.

Carnallite, $KCl \cdot MgCl_2 \cdot 6H_2O$, is an important ore, that often includes amounts of sodium chloride, generally as halite or sylvinite, a mixutre of halite and sylvite. The solution mining of carnallite has proven difficult since carnallite decomposes in the presence of water into its constituents with magnesium chloride going into solution more readily than the potassium chloride, which dissolves only to a minor extent. While carnallite is formed in the intermediate stages of some above-ground beneficiation processes for other ores as shown, inter alia, in U.S. Pat. Nos. 2,479,001; 2,758,912; 2,759,794; and 3,342,548, the difficulty regarding solution mining of carnallite is acknowledged, inter alia, in U.S. Pat. No. 3,355,212 wherein both magnesium chloride and potassium chloride are added to the brine in an effort to balance its dissolving power.

SUMMARY OF THE INVENTION

The instant invention provides a process for the recovery of ore values from carnallite by solution mining techniques and, in particular, provides an integrated process for the solution mining of carnallite ore and recovery of ore values. This invention, in a minimum of process steps, provides a magnesium chloride product of good purity and a synthetic sylvinite that may be processed for the recovery of potassium chloride.

The process of this invention comprises (a) contacting an underground carnallite-containing ore deposit with an aqueous stream to impregnate the solution with magnesium chloride (including magnesium chloride in the form of carnallite); (b) removing the impregnated solution from the underground ore deposit; (c) removing sufficient water from the impregnated solution to precipitate substantially all the potassium chloride (including potassium chloride in the form of carnallite) dissolved from the formation and form a slurry; (d) filtering the slurry to provide a magnesium chloride-containing filtrate and a carnallite-containing filter cake; (e) removing the filtrate, at least part of which provides a magnesium chloride product; (f) forming a slurry of the filter cake by mixing the filter cake with sufficient water to decompose the carnallite to soluble magnesium chloride and insoluble potassium chloride; and (g) filtering the slurry formed in step (f) to provide a magnesium chloride-containing filtrate which is recycled to step (c) and a filter cake containing potassium chloride from which a potassium chloride product may be recovered.

The process of this invention includes two primary embodiments. In one of these, water or a dilute solution of magnesium chloride is used as a solvent to mainly recover magnesium chloride, such as for the subsequent production of magnesium and chlorine. When a dilute magnesium chloride solution is used, the concentration of the magnesium chloride in the solution will be at a level below that at which carnallite begins to form (at about 25 percent magnesium chloride) so that carnallite will decompose and solution of substantially only the magnesium chloride component of the carnallite will take place. It will be apparent that the more dilute concentrations of the magnesium chloride will be preferred, with a maximum magnesium chloride concentration of about 10 percent being more preferred and a concentration less than about 10 percent being most preferred. Relatively minor amounts of potassium chloride will be dissolved, and most of the potassium chloride present in carnallite or sylvite will be left in the formation as an insoluble residue with sodium chloride and clays. The potassium chloride recovery is thus incidental and by-product in nature.

In the second embodiment of this invention, a relatively concentrated magnesium chloride solution is used at an elevated temperature as the solvent to recover both potassium chloride and magnesium chloride. The concentration of the magnesium chloride in the solution introduced into the formation is controlled at a value so that the solution will dissolve carnallite from the formation without decomposing any substantial amount of the carnallite to solid phase potassium chloride as disclosed in the preceeding paragraph. The resulting solution is removed from the deposit, and is processed so as to recover the magnesium chloride, as well as the potassium chloride in sufficient quantity to be a valuable co-product with the magnesium chloride.

The aforementioned embodiments will be described in further detail as reference is made to the accompanying drawing which is a flow diagram illustrating the process of this invention.

DESCRIPTION OF THE PREFERRED EMBODIMENTS

In the initial step of the embodiment of this invention for recovering substantially only the magnesium chloride component from a carnallite deposit, an underground carnallite ore deposit is contacted with an aqueous stream to impregnate the solution with magnesium chloride. The aqueous stream supplied to the ore deposit can be ordinary water or an aqueous solution containing magnesium chloride at a concentration below that at which carnallite forms, i.e., below about 25 percent magnesium chloride. Inasmuch as the solution must be as dilute as possible with respect to magnesium chloride to permit a high rate of solution of magnesium chloride upon the decomposition of carnallite, a maximum magnesium chloride concentration of about 10 percent by weight is preferred and a concentration less than about 10 percent is most preferred. The carnallite decomposes in the presence of the aqueous stream and magnesium chloride, along with minor amounts of potassium chloride and sodium chloride, if present in the formation, are dissolved.

The impregnated solution is removed from the well and sufficient water is removed from the solution to form a slurry of sodium chloride (if present in the formation) and potassium chloride as carnallite dissolved from the formation. A recycle stream of magnesium chloride solution formed as described below is mixed with the magnesium chloride-impregnated solution in the water removal step. The water may be removed simply by boiling the solution, although reduced pressure may be employed if desired. The resulting slurry is filtered to provide a saturated magnesium chloride filtrate and a carnallite and sodium chloride-containing filter cake. The magnesium chloride filtrate is removed and can be processed according to known techniques such as electrolysis or the like for the recovery of magnesium metal or magnesium chemicals.

The carnallite and sodium chloride-containing filter cake is mixed with sufficient water to decompose the carnallite to essentially soluble magnesium chloride and essentially insoluble potassium chloride. The sodium chloride remains essentially crystalline. The resulting slurry is filtered to provide a magnesium chloride-containing filtrate which is recycled to the water removal step described above. The filter cake containing a synthetic sylvinite, i.e., sodium chloride and potassium chloride, may be treated by processes well known in the art to provide dry potassium chloride. The amount of water required to decompose the carnallite is readily within the skill of the routineer and generally will be from about 12 to about 20 percent, based on the weight of the filter cake.

Potassium chloride present in the synthetic sylvinite can, for example, be dissolved in a heated, aqueous solution saturated with respect to sodium chloride, at a temperature of from about 60° to about 105° C. The solution is then treated to reduce the amount of water present, as by evaporation, to maintain a water balance, namely, to remove water in an amount of about that adhering to the sylvinite as process brine or wash water. Sodium chloride, which is insoluble, is removed by filtration, centrifugation, or the like, and disposed of or recovered as a by-product. The filtrate solution can then be cooled in a crystallization tank to precipitate potassium chloride while sodium chloride remains in solution. The solid potassium chloride is removed by filtration or the like, and dried to provide solid, dry, potassium chloride product. Alternatively, the potassium chloride can be recovered by froth flotation employing anionic flotation.

This embodiment will be further described in reference to the accompanying FIGURE in which an underground carnallite ore-containing deposit 1 is solution-mined by contact of the ore at a temperature of from about 20° to about 100° C., preferably from about 30° to about 60° C. with water or a dilute (e.g., 10 percent) aqueous solution of magnesium chloride supplied through line 2. By allowing sufficient time, the solvent contacting the ore dissolves magnesium chloride until it becomes saturated with carnallite. The well liquor is withdrawn from the ore and transferred by line 4 to evaporator 5. Sufficient water is removed from the solution to precipitate substantially all the sodium chloride and potassium chloride, as carnallite, dissolved from the formation. Generally, about 35 to about 45 percent by weight, preferably from about 38 to about 44 percent by weight, of the total water content of the well liquor is removed at a temperature of from about 50° to about 110° C., preferably from about 90° to about 110° C. The solution from evaporator 5 is cooled to a temperature of from about 25° to about 75° C., preferably from about 50° to about 70° C., to form a slurry. The well liquor is mixed in the evaporator 5 with a magnesium chloride-containing solution recycled by line 6 from filter 16 as described below. The water removed in evaporator 5 can be taken off via line 7 for disposal. While continuous evaporation is shown, it will be apparent that a batch operation may be employed wherein the liquor in the evaporator is alternately concentrated and cooled.

The slurry is conveyed from evaporator 5 via line 8 to filtering apparatus 9 which can be any suitable liquid-solid filter. The filtrate, which is essentially a saturated solution of magnesium chloride in water, is removed by line 10 for the ultimate production of valuable magnesium metal or magnesium chemicals. The magnesium chloride can be separated from the filtrate by standard methods and, on complete dehydration, may be treated by electrolysis, as known in the art.

The filter cake from the filter 9, which is composed of carnallite, sodium chloride and residual water, is conveyed through line 12 to the carnallite decomposition tank 13 where it is mixed with sufficient water from line 14 to decompose the carnallite and form a slurry. The magnesium chloride component of the carnallite is essentially soluble in the water while the potassium chloride component is essentially insoluble. A small amount, e.g., from about 15 to about 20 percent of the total potassium chloride, may remain in solution. The sodium chloride present in the filter cake remains essentially insoluble. Generally, the decomposition will occur at ambient temperature although temperatures of from about 20° to about 60° C. may be employed.

The slurry is then conveyed via line 15 to filter 16 to separate a magnesium chloride-containing filtrate and a filter cake containing potassium chloride and sodium chloride. The filtrate is recycled through line 6 to evaporator 5.

The filter cake from filter 16 can then be processed for the recovery of potassium chloride by known means. One such process is shown. The filter cake from filter 16 can be conveyed by line 17 to dissolver 18 where it is dissolved in an aqueous stream 34. Advantageously, the aqueous stream 34 is composed in part or all by stream 19 from the filter 29. The stream 19 is an aqueous solution of potassium chloride and sodium chloride, as explained hereinbelow. Dissolver 18 also can contain heating means (not shown) to heat the materials to a temperature of from about 60° to about 105° C. The heated solution from the dissolver 18 is conveyed via line 20 to evaporator 21 where sufficient water is removed to maintain a water balance. Generally, from about 3 to about 7 percent by weight of the total water in solution is removed. The water is removed via line 22 for disposal. The resulting slurry is transferred through line 23 to filter 24, which can be any suitable liquid-solid filtering apparatus. Solid sodium chloride is removed via line 25 for disposal, or it can, if desired, be recovered as a by-product of the process.

The filtrate from filter 24, containing potassium chloride and the remaining sodium chloride in solution, is conveyed by line 26 to crystallizer 27 where it is cooled to a temperature sufficient to precipitate at least part of the potassium chloride while the remaining sodium chloride stays in solution. The solution can be cooled, for example, to a temperature or from about 25° to about 40° C. The resulting slurry is conveyed via line 28 to filter 29. The filtrate from filter 29, which contains sodium chloride and which also may, and generally does, contain some potassium chloride, can be recycled by lines 19 and 34 to dissolver 18.

The filter cake in filter 29 comprises essentially potassium chloride and residual water. The filter cake may be passed through line 30 to dryer 31 in which the residual water is separated from the potassium chloride and removed by line 32 for disposal. Dry potassium chloride product in solid form is removed via line 33.

Equipment well-known in the art may be employed in each of the steps of this invention.

The embodiment of this invention for recovering both the potassium chloride and magnesium chloride components from a carnallite deposit is substantially the same as the other embodiment hereinbefore described. However, several changes are necessarily required by the utilization of a heated aqueous solution containing at least 25 percent magnesium chloride to recover both potassium chloride and magnesium chloride.

This embodiment is best described by again referring to the flowsheet acoompanying the application. As shown in the accompanying flowsheet, an underground carnallite ore-containing deposit 1 is contacted with a heated aqueous solution of magnesium chloride supplied through line 2. The concentration of the magnesium chloride in the solution is from about 25 to about 36 percent by weight, preferably from about 25 to about 32 percent by weight, and the solution is at a temperature from about 50° to about 110° C., preferably from about 90° to about 100° C. The aqueous solution of magnesium chloride can advantageously be a recycle stream 3 composed of a major part (e.g., from about 50 to about 80 percent by weight, preferably from about 72 to about 80 percent by weight) of the filtrate in line 10 from filter 9, as hereinafter described.

The well liquor is removed from deposit 1 by line 4 and transferred to evaporator 5 where it is mixed with a magnesium chloride-containing solution recycled from filter 16 through line 6, as hereinafter described. Evaporator 5 is operated under conditions necessary to remove sufficient water, e.g., from about 30 to about 40 percent by weight, preferably from about 33 to about 38 percent by weight, of the well liquor to precipitate substantially all of its sodium chloride and carnallite content. This water removal operation is conducted at a temperature of from about 50° to about 110° C., preferably from about 90° to about 110° C. The water removed in evaporator 5 is disposed of through line 7. The remaining solution obtained from evaporator 5 is cooled to a temperature of from about 25° to about 75° C., preferably from about 50° to about 75° C., to form a slurry.

The slurry recovered from evaporator 5 is transferred by line 8 to filter 9, where it is separated into a filter cake and filtrate. The filtrate is essentially a saturated aqueous solution of magnesium chloride and is removed via line 10 for further processing, such as for the recovery of magnesium. Part of the filtrate stream 10, preferably a major part, e.g., from about 50 to about 85 percent and most preferably from about 72 to about 80 percent, can be diluted if desired and recycled via line 3 to serve as the carnallite-contacting stream. A heater 11 can be provided in line 3 to heat the stream to proper contacting temperature.

The filter cake obtained from filter 9 is then processed as hereinbefore described with respect to the other embodiment to separate the remaining magnesium chloride from the potassium chloride and sodium chloride. This is accomplished by conveying the filter cake via line 12 to decomposition tank 13 where it is combined with sufficient water from line 14 to decompose the carnallite and form a slurry comprised essentially of solid potassium chloride and sodium chloride in a magnesium chloride solution. The slurry is transferred through line 15 to filter 16, where a magnesium chloride-containing filtrate is separated from a filter cake containing potassium chloride and sodium chloride. The filtrate is recycled through line 6 to evaporator 5, and the filter cake in line 17 is processed by any suitable means for the recovery of potassium chloride, such as hereinbefore outlined with respect to the flowsheet.

This invention is still further described by reference to the following non-limiting examples.

EXAMPLE I

The process of this invention is applied to carnallite ore deposits adjacent to and under the Quill Lakes of Sasketchewan. Analysis of the ore deposits shows it contains about 16.1 percent potassium chloride, about 20.5 percent magnesium chloride, about 38.0 percent sodium chloride, about 23.4 percent water and about 2.0 percent insolubles. All percentages given in the examples are in weight unless otherwise indicated.

An aqueous solution of magnesium chloride is made by dissolving 582 tons of magnesium chloride in 1,000 tons of water, yielding a solution containing about 36.4 percent magnesium chloride. The solution also contains minor amounts, e.g., about 0.7 percent and 0.2 percent, respectively, of potassium chloride and sodium chloride present as impurities. Water is added (358 tons) and the solution is heated to 100° C. The resulting solution contains about 29.8 percent magnesium chloride. The heated solution is pumped into the ore deposit and about 850 tons of the ore is solution-mined and dissolved in the heated solution. About 292.5 tons of the ore remains as residue in the well and consists of the insolubles and about 85.5 percent of the sodium chloride originally present. The liquor from the well, at a temperature of about 100° C., contains about 5.9 percent potassium chloride, about 30.1 percent magnesium chloride, about 2.0 percent sodium chloride and 62.0 percent water.

The liquor from the well is then mixed with a recycle magnesium chloride-containing solution from the carnallite decomposition step as explained below. This recycle liquor contains about 3.7 percent potassium chloride, about 26.9 percent magnesium chloride, about 1.6 percent sodium chloride and about 67.8 percent water. Water is removed by evaporation from the resulting solution in an amount of about 16.6 percent of the combined solution and the solution is cooled to about 60° C. Substantially all of the potassium and sodium chloride in the solution are precipitated with the potassium chloride crystallizing as carnallite.

The resulting slurry of solution and solids is filtered. A small amount of wash water is added to facilitate filtering. The filter cake contains about 19.5 percent potassium chloride, about 25.0 percent magnesium chloride, about 7.0 percent sodium chloride and about 48.5 percent water. The filtrate contains about 0.7 percent potassium chloride, about 0.2 percent sodium chloride and about 36.4 percent magnesium chloride, balance water. The filtrate is removed from the filtering operation and about 81 percent of the total filtrate is recycled, diluted with water and employed as the aqueous magnesium chloride solution used for solution-mining of the carnallite ore. The balance of the filtrate is removed and sent to suitable processing equipment known in the art for the production of valuable magnesium chemicals. Typically, the magnesium chloride present in the solution can be treated, after dehydration, in an electrolysis operation to produce magnesium metal and chlorine.

The separated filter cake is mixed with sufficient water, e.g., about 14.5 percent of the weight of the filter cake, to decompose the carnallite essentially to soluble magnesium chloride and insoluble potassium chloride. The sodium chloride remains essentially insoluble. The resulting slurry is filtered. A small amount of wash water is again added to facilitate filtering. The filtrate contains substantially all the magnesium chloride present in the filter cake and small amounts of potassium chloride and sodium chloride, e.g., 3.7 percent potassium chloride, 26.9 percent magnesium chloride, 1.6 percent sodium chloride and 67.8 percent water. The filtrate is recycled as the recycle magnesium chloride-containing liquor added to the well liquor in the evaporation step as explained above. The filter cake is essentially a synthetic sylvinite and contains 59.4 percent potassium chloride, 20.5 percent sodium chloride and 20.1 percent water. On a dry basis, the filter cake is equivalent to 74.4 percent potassium chloride and 24.6 percent sodium chloride.

The synthetic sylvinite filter cake can be treated to provide dried potassium chloride. The filter cake is dissolved at a temperature of about 90° C. in a recycle brine solution from the product filtering step as explained below. The recycle brine solution contains about 12.5 percent potassium chloride, about 18.9 percent sodium chloride and about 68.6 percent water. The resulting solution contains about 19.4 percent potassium chloride, about 19.1 percent sodium chloride and about 61.5 percent water and is transferred to an evaporator where about 4.8 percent of the water is removed. The resulting solution is then centrifuged to remove crystallized sodium chloride. About 16 percent of the sodium chloride is removed. The centrifuged product is fed to a crystallizer where it is cooled to about 30° C. A substantial amount, e.g., about 45 percent of the potassium chloride in the solution precipitates out. The sodium chloride stays essentially in solution. The discharged slurry from the crystallizers is filtered with a small amount of wash water being used to facilitate filtering. The filtrate, which contains about 12.5 percent potassium chloride, about 18.9 percent sodium chloride and about 68.6 percent water is recycled to the dissolving step, as explained before, as the recycle brine solution. The filter cake contains potassium chloride and water. This filter cake is dried and potassium chloride is recovered as product.

EXAMPLE II

In this example carnallite ore deposits as in Example I are subjected to solution-mining with water. Water, in an amount of about 285.2 tons is pumped into an ore deposit to contact 1,000 tons of carnallite ore of the composition outlined in Example I. About 519.7 tons of residue is left in the mine with residue comprising about 25.4 percent potassium chloride, about 70.7 percent sodium chloride and about 3.8 percent insolubles. The liquor from the mine (765.5 tons) contains about 3.8 percent potassium chloride, about 26.9 percent magnesium chloride, about 1.6 percent sodium chloride and about 67.8 percent water. The temperature of the liquor from the mine is about 40° C.

The mine liquor is then mixed with a carnallite decomposition liquor recycle stream in the same manner as in Example I. In this instance, the recycle liquor contains 3.6 percent potassium chloride, 26.7 percent magnesium chloride, 1.9 percent sodium chloride and 67.8 percent water. Water in an amount of about 24 percent of the combined mined liquor-recycle stream is evaporated and the solution temperature is about 60° C. Substantially all the carnallite and sodium chloride in the solution are precipitated.

The resulting slurry is filtered with a small amount of wash water being added to facilitate the filtering. The filtrate solution contains about 36.3 percent magnesium chloride, about 0.8 percent potassium chloride, about 0.3 percent sodium chloride and about 62.6 percent water. This solution is removed and may be treated, as by electrolysis, to obtain magnesium metal and chlorine. The filter cake contains about 19.1 percent potassium chloride, about 24.5 percent magnesium chloride, about 8.9 percent sodium chloride and about 47.5 percent water.

The separated filter cake is mixed with sufficient water, e.g., about 14.7 percent of the weight of the filter cake, to decompose the carnallite to substantially soluble magnesium chloride and substantially insoluble potassium chloride. The sodium chloride remains essentially insoluble. The resulting slurry is filtered to yield a filtrate containing about 3.6 percent potassium chloride, about 26.7 percent magnesium chloride, about 1.9 percent sodium chloride and about 67.8 percent water. The filtrate is recycled to the evaporation and crystallization step as the carnallite decomposition liquor.

The filter cake is essentially a synthetic sylvinite and contains about 54.9 percent potassium chloride, about 24.9 percent sodium chloride and about 20.2 percent water. On a dry basis, the filter cake is equivalent to about 68.8 percent potassium chloride and about 31.2 percent sodium chloride. The synthetic sylvinite is treated in the same manner as in Example I for the recovery of dried potassium chloride.

The embodiments of the invention in which an exclusive property or privilege is claimed are defined as follows:

1. A process for recovering magnesium chloride from a carnallite-containing ore deposit by solution mining which comprises:

a. contacting a carnallite-containing ore deposit with a first aqueous stream containing less than about 25 percent by weight of dissolved magnesium chloride to impregnate said stream with magnesium chloride and a minor amount of potassium chloride;

b. removing the magnesium chloride-impregnated stream from said ore deposit;

c. removing sufficient water from said magnesium chloride-impregnated stream to precipitate substantially all the potassium chloride dissolved from the formation and form a slurry;

d. filtering said slurry to provide a magnesium chloride-containing filtrate and a carnallite-containing filter cake;

e. removing said filtrate, at least part of which provides a magnesium chloride product;

f. forming a slurry by mixing said filter cake with sufficient water to decompose the carnallite content thereof to insoluble potassium chloride and soluble magnesium chloride which is dissolved in said water;

g. filtering the slurry formed in step (f) to provide a magnesium chloride-containing filtrate and a potassium chloride-containing filter cake;

h. dissolving the filter cake from step (g) in a second aqueous stream;

i. removing from about 3 to about 7 percent of the water from the solution formed in step (h);

j. cooling the solution obtained from step (i) to a temperature sufficient to precipitate at least part of the potassium chloride content thereof; and k. separating the precipitated potassium chloride to provide a potassium chloride product.

2. The process of claim 1 wherein the magnesium chloride-containing filtrate from step (g) is recycled to step (c).

3. The process of claim 2 wherein said first aqueous stream contains less than 10 percent by weight of dissolved magnesium chloride.

4. The process of claim 3 wherein said carnallite-containing ore deposit is contacted with said first aqueous stream at a temperature of from about 20° to about 100° C.

5. The process of claim 4 wherein said magnesium chloride-impregnated stream is cooled to a temperature of from about 25° to about 75° C. in step (c) to form said slurry after water is removed therefrom at a temperature of from about 50° to about 110° C.

6. The process of claim 5 wherein from about 35 to about 45 percent by weight of the water content of the magnesium chloride-impregnated solution is removed in step (c).

7. The process of claim 6 wherein at least part of said second aqueous stream is a recycle stream of the solution separated from the precipitated potassium chloride in step (k).

8. The process of claim 7 wherein said carnallite-containing deposit is contacted with said first aqueous stream at a temperature of from about 30° to about 60° C.

9. The process of claim 8 wherein said magnesium chloride-impregnated stream is cooled to a temperature of from about 50° to about 70° C. in step (c) to form said slurry after water is removed therefrom at a temperature of from about 90° to about 110° C.

10. The process of claim 9 wherein from about 38 to about 44 percent by weight of the water content of the magnesium chloride-impregnated solution is removed in step (c).

* * * * *

FO-1050
(5/69)

UNITED STATES PATENT OFFICE
CERTIFICATE OF CORRECTION

Patent No. __3,829,559__   Dated __August 13, 1974__

Inventor(s) __William B. Dancy__

It is certified that error appears in the above-identified patent and that said Letters Patent are hereby corrected as shown below:

In the Abstract, Line 2, "carnalitte" should be --carnallite--. Column 4, line 58, "or" should be --of--. Column 8, line 51, between "said" and "stream", --first aqueous-- should be inserted; line 60, between "slurry" and "to", --formed in step (c)-- should be inserted; line 63, between "filtrate" and the comma(,), --obtained in step (d)-- should be inserted; line 65, between "cake" and "with", --from step (d)-- should be inserted. Column 9, line 17, delete the period (.) and add --and combined with said magnesium chloride-impregnated stream.--

Signed and sealed this 4th day of March 1975.

(SEAL)
Attest:

RUTH C. MASON
Attesting Officer

C. MARSHALL DANN
Commissioner of Patents
and Trademarks